United States Patent
Timsjo et al.

(10) Patent No.: US 9,201,419 B2
(45) Date of Patent: Dec. 1, 2015

(54) METHOD AND SYSTEM FOR CONTROLLING AN INDUSTRIAL PROCESS

(75) Inventors: Susanne Timsjo, Vasteras (SE); Martin Olausson, Vasteras (SE); Hongyu Pei-Breivold, Vasteras (SE)

(73) Assignee: ABB Research Ltd. (CH)

( * ) Notice: Subject to any disclaimer, the term of this patent is extended or adjusted under 35 U.S.C. 154(b) by 457 days.

(21) Appl. No.: 13/614,571

(22) Filed: Sep. 13, 2012

(65) Prior Publication Data

US 2013/0066446 A1      Mar. 14, 2013

(30) Foreign Application Priority Data

Sep. 14, 2011   (EP) .................................... 11181176

(51) Int. Cl.
   *G05B 15/00*   (2006.01)
   *G05B 19/418*  (2006.01)
   *G05B 23/02*   (2006.01)

(52) U.S. Cl.
   CPC ...... *G05B 19/41845* (2013.01); *G05B 23/0232* (2013.01); *G05B 2219/32404* (2013.01)

(58) Field of Classification Search
   None
   See application file for complete search history.

(56) References Cited

U.S. PATENT DOCUMENTS

| | | | |
|---|---|---|---|
| 7,250,856 B2 * | 7/2007 | Havekost et al. | 340/517 |
| 2004/0145462 A1 * | 7/2004 | Ambrose | 340/441 |

FOREIGN PATENT DOCUMENTS

| | | |
|---|---|---|
| EP | 2328051 A1 | 6/2011 |

OTHER PUBLICATIONS

European Search Report; Application No. EP 11 18 1176; Issued:Dec. 7, 2011; 5 pages.
Edith Quispe Holgado, et al.; "Optimization of WAMDAS: A Web Service-Based Wireless Alarm Monitoring and Data Acquisition System for Pharmaceutical Plants"; Information Technology: New Generations, 2008. Fifth International Conference on, IEEE, Piscataway, NJ, USA, Apr. 7, 2008, pp. 988-993.
Francesco Adamo, et al.; "SCADA/HMI Systems in Advanced Educational Courses"; IEEE Transactions on Instrumentation and Measurement, IEEE Service Center, Piscataway, NJ, US, col. 55, No. 1, Feb. 1, 2007; pp. 4-10.
Barriuso Poy A, et al.; "The Detector Control System of the ATLAS Experiment"; Journal of Instrumentation, Institute of Physics Publishing, Bristol GB, vol. 3, No. 5, May 1, 2008; p. 23-p. 34.

* cited by examiner

*Primary Examiner* — Sean Shechtman
(74) *Attorney, Agent, or Firm* — Whitmyer IP Group LLC

(57) ABSTRACT

A method of monitoring and controlling an industrial process associated with a plurality of process variables by a control system including displaying a set of process related images which are user-selected on a display device of the control system, each process related image of the set of process related images being associated with a process variable of the plurality of process variables; receiving process variable data of the plurality of process variables while the step of displaying is carried out, and when process variable data is received indicating that a process variable has a status value outside a predetermined accepted range; and displaying, on the display device, a process related image which is associated with the process variable with the status value outside the predetermined accepted range, receiving an input command for controlling the process variable, and controlling the process variable based on the input command.

14 Claims, 3 Drawing Sheets

METHOD AND SYSTEM FOR CONTROLLING AN INDUSTRIAL PROCESS

CROSS-REFERENCE TO RELATED APPLICATIONS

The present application claims priority of European patent application No. 11181176.6 filed on Sep. 14, 2011, the content of which is incorporated herein by reference.

FIELD OF THE INVENTION

The present disclosure generally relates to monitoring and controlling an industrial process and in particular to a method and a system for such purposes.

BACKGROUND OF THE INVENTION

Industrial control systems, process control systems, Supervisory Control and Data acquisition (SCADA) systems and the like have displays for displaying a graphic diagram of the industrial system to operators monitoring the industrial system.

Operators may thereby be able to recognize an alarm or a trend in the industrial system and, as a result, take measures to solve the problem giving rise to the alarm or trend.

Existing industrial system control systems have several drawbacks, including having user interfaces which are non-intuitive and which provide strain injuries to the operators.

SUMMARY OF THE INVENTION

In view of the above, a general object of the present disclosure is to simplify the monitoring and control of an industrial process for the process operator.

Thus according to a first aspect of the present disclosure there is provided a method of monitoring and controlling an industrial process by means of a control system, the industrial process being associated with a plurality of process variables, the method comprising the steps of:
  displaying a set of process related images, which are user-selected, on a display device of the control system, each process related image of the set of process related images being associated with a process variable of the plurality of process variables, wherein the process related images of the set of process related images are displayed in succession, and wherein a duration of displaying each process related image of the set of process related images is predetermined,
  receiving process variable data of the plurality of process variables while the displaying is carried out, and when process variable data is received indicating that a process variable has a status value outside a predetermined accepted range, and in response thereto:
  displaying, on the display device, a process related image which is associated with the process variable having the status value outside the predetermined accepted range,
  receiving an input command for controlling the process variable, and
  controlling the process variable based on the input command.

By displaying the set of process related images in succession, in a slide-show type of manner, an operator may be able to monitor the industrial process parts shown by the set of process related images without having to interact with an input unit of the display device in order to browse trough the different process related images when monitoring the industrial process. The work of the operator is thereby simplified, and the risk of strain injuries to the operator is reduced. Moreover, the operator's attention is immediately drawn to a process related image associated with an abnormal situation as soon as an abnormal situation occurs due to the fact that the relevant process related image, i.e. the process related image which is associated with the process variable having the status value outside the predetermined accepted range is shown in response to receiving process variable data indicating that a process variable has a status value outside a predetermined accepted range. Since an operator may be responsible of monitoring a plurality of parts of the industrial process, the direct displaying of an affected part of the process allows the operator to act within a very short time after the abnormal situation has occurred.

One embodiment comprises, prior to the step of displaying, receiving a user input for selecting the set of process related images to be displayed in the step of displaying from a superset of process related images. Thereby a user or operator may select those parts or portions of the industrial process to be shown in the set of process related images which he or she e.g. is responsible to monitor.

One embodiment comprises determining an order of relevance of the set of process related images based on the process variable data. Thus, if several process variables have a status value outside a predetermined accepted range, their order or relevance may be determined, wherein the set of process related images may be sorted and displayed based on the determined order of relevance.

Hence, one embodiment comprises sorting the process related images based on the order of relevance.

In one embodiment the step of displaying comprises displaying the process related images according to the order of relevance of the sorted process related images.

In a second aspect of the present disclosure there is provided a computer program product comprising a computer readable medium having a computer program stored thereon, which computer program when executed performs the method of the first aspect of the present disclosure.

According to a third aspect of the present disclosure there is provided a control system for controlling an industrial process which is associated with a plurality of process variables, the control system comprising:
  a plurality of control units, each control unit being arranged to control a respective process variable of the plurality of process variables,
  a display device arranged to display a set of process related images which have been user-selected, each process related image of the set of process related images being associated with a process variable of the plurality of process variables, wherein the control system is arranged to display the process related images in succession on the display device, and wherein a duration of displaying each process related image of the set of process related images is predetermined,
  and an input unit arranged to receive input commands,
  wherein the control system is arranged to receive process variable data of the plurality of process variables, and wherein when process variable data indicating that a process variable has a status value outside a predetermined accepted range is received by the control system the display device is arranged to display a process related image which is associated with the process variable having the status value outside the predetermined accepted range, and wherein the input unit is arranged to receive an input command to control the process variable having the status value outside the predetermined accepted range, and wherein a control unit associated with the process variable with the status value outside the predetermined accepted range is arranged to control that process variable based on the input command.

In one embodiment the control system is arranged to receive a user input for selecting the set of process related images to be displayed on the display device from a superset of process related images.

In one embodiment the control system is arranged to determine an order of relevance of the set of process related images based on the process variable data.

In one embodiment the control system is arranged to sort the process related images based on the order of relevance.

In one embodiment the display device is arranged to display the process related images according to the order of relevance of the sorted process related images.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept will now be described, by way of example, with reference to the accompanying drawings, in which.

DETAILED DESCRIPTION OF THE INVENTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
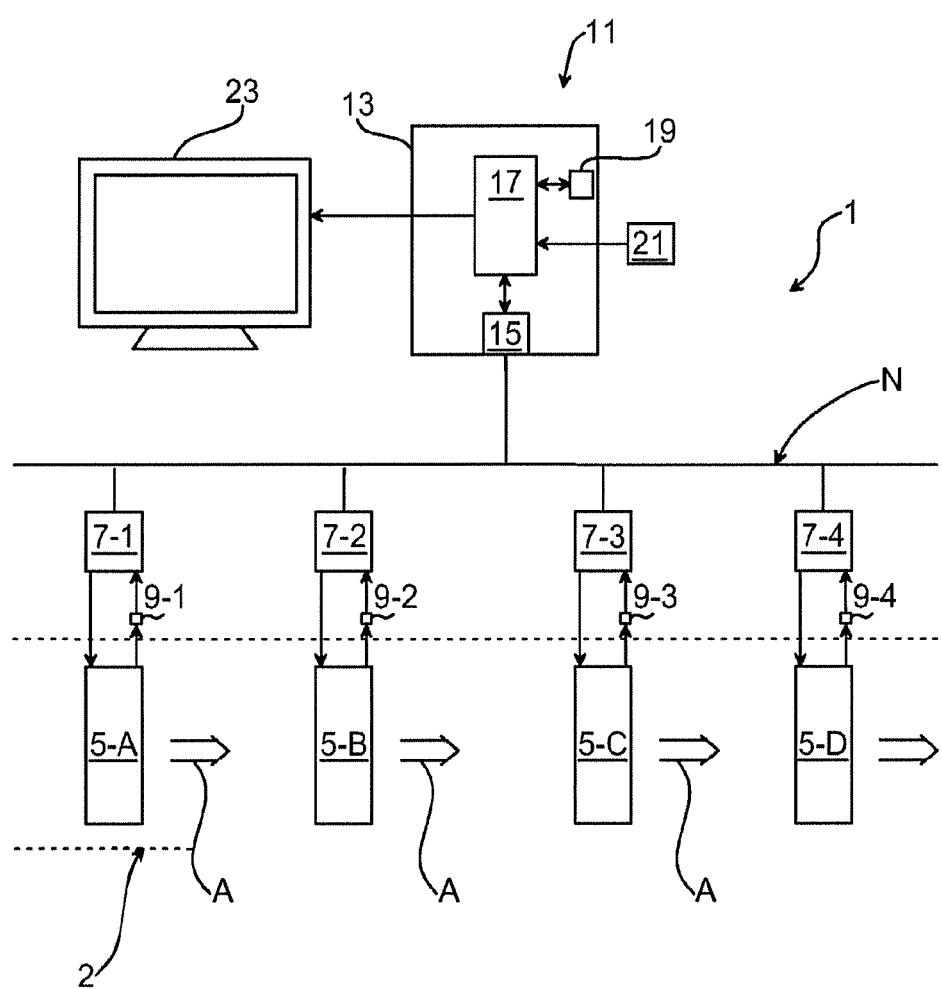
FIG. 1 is is a schematic view of a control system arranged to control an industrial process.

FIG. 1 schematically shows an example of a control system 1 for monitoring and controlling an industrial process 3. The industrial process 3 usually involves various process steps carried out by one or more process component 5-A, 5-B, 5-C and 5-D. The process flow according to the example of FIG. 1 is in a direction from left to right, as indicated by arrows A.

An industrial process is to be understood to mean for instance a process relating to the refining of oil and gas, the petrochemical industry, power generation, power transmission, power distribution, metals and mining, chemical industry, pulp and paper, or automation in e.g. the manufacturing industry or food industry. It is to be noted that the present inventive concept can be utilised for monitoring and/or controlling many different types of industrial processes, with only a few examples having been given above.

In one embodiment the control system 1 is a distributed control system. The control system may also be of SCADA type. In such embodiments, the control system 1 comprises a plurality of control units 7-1, 7-2, 7-3, 7-4 and a plurality of sensors 9-1, 9-2, 9-3, 9-4 associated with a respective control unit 7-1, 7-2, 7-3, 7-4. Each sensor 9-1, 9-2, 9-3, 9-4 of the plurality of sensors is arranged to measure one or more process variable(s) of a process component 5-A, 5-B, 5-C, 5-D. Each control unit 7-1, 7-2, 7-3, 7-4 is arranged to control a process component 5-A, 5-B, 5-C, 5-D according to a respective setpoint value which can be set by means of the control system 1.

A process component may for instance be a tank, a valve, a turbine, a roller or a cluster or rollers for a pulp and paper mill, drying equipment, a refiner, a generator, a motor, a transformer or a boiler.

A process variable is to be construed as a measurable quantity, such as pressure, temperature or voltage, associated with a process component.

The control units 7-1, 7-2, 7-3, 7-4 may for instance be Remote Terminal Units (RTU) or Programmable Logic Controllers (PLC). In one embodiment the control system comprises a combination of RTUs and PLCs.

Alternatively, the control system may be a centralised control system having one control unit, such as a PLC, providing control signals to one or more process components.

The control system 1 of FIG. 1 further comprises a communications network N and a Human-Machine-Interface (HMI) 11. The communications network N is arranged to enable data communication between the control units 7-1, 7-2, 7-3, 7-4 and the HMI 11. Thereby communication may be achieved between a control system operator and the industrial process 2. The HMI 11 comprises a computer device 13, an input unit 21, and a display device 23.

The computer device 13 comprises a communications unit 15 arranged to communicate with the control units 7-1, 7-2, 7-3, 7-4, a processor 17 and a memory 19, and an input unit 21 arranged to receive input commands from a user of the control system 1, e.g. a process operator. The communications unit 15 is arranged to receive data, such as process variable data pertaining to one or more process variables, from the control units 7-1, 7-2, 7-3, 7-4. The communications unit 15 may also be arranged to send data such as a control command to the control units 7-1, 7-2, 7-3, 7-4 for controlling the industrial process 2, e.g. by changing the setpoint value of one or more control units 7-1, 7-2, 7-3, 7-4. A control command may be based on an input command received by the input unit 21.

The processor 17 is arranged to receive data such as process variable data, process the data, and optionally store the data in the memory 19, the data having been received by the communications unit 15 or the input unit 21. Furthermore, the processor 17 is arranged to display data on the display device 23. Such data may for instance be displayed on the display device 23 in the form of one or more process related images.

A process related image is to be construed as a graphical image showing a view of a graphical representation of one or more process components, trend charts, process statistics or any other type of data relating to the industrial process.

Beneficially, the HMI 11 defined by the display device 23 the computer device 13 and the input unit 21 allows a user such as an operator to interact with the industrial process 2. The industrial process 2 may thereby be monitored and controlled.

In one embodiment the display device is also the input unit. In this case the display unit may be a touch-screen device. In one embodiment, the input unit may be a gesture-based detection unit arranged to detect gestured-based input by a user. In further embodiments, the input unit may be a mouse, a keyboard or any other similar traditional input means.

The processor 17 may comprise software for processing process variable data, displaying process related images on the display device and for providing control commands to the control units 7-1, 7-2, 7-3, 7-4 for controlling the industrial process 2.

An example of a method of monitoring and controlling an industrial process will now be described in more detail with reference to FIGS. 2a-b and FIG. 3.

Figure 2A:
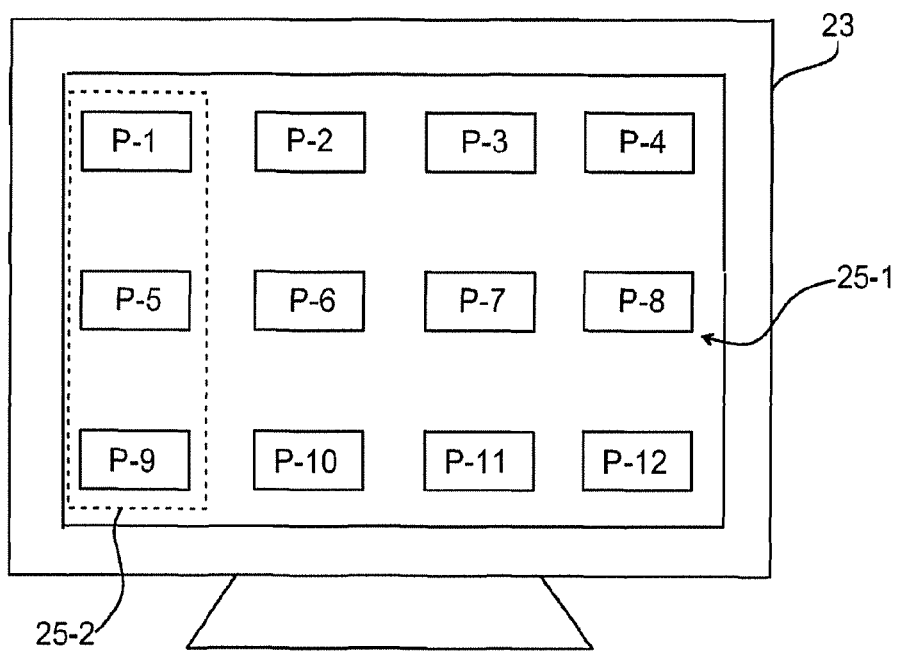
FIG. 2A-B illustrate views of a display device displaying a set of process related images.

FIG. 2a shows a schematic view of a display device 1 displaying a plurality of process related images P-1 to P-12. Each process related image may for instance show one or more process component(s), trend charts or other information of an industrial process. Typically, each process related image P-1 to P-12 display different process components.

Figure 3:
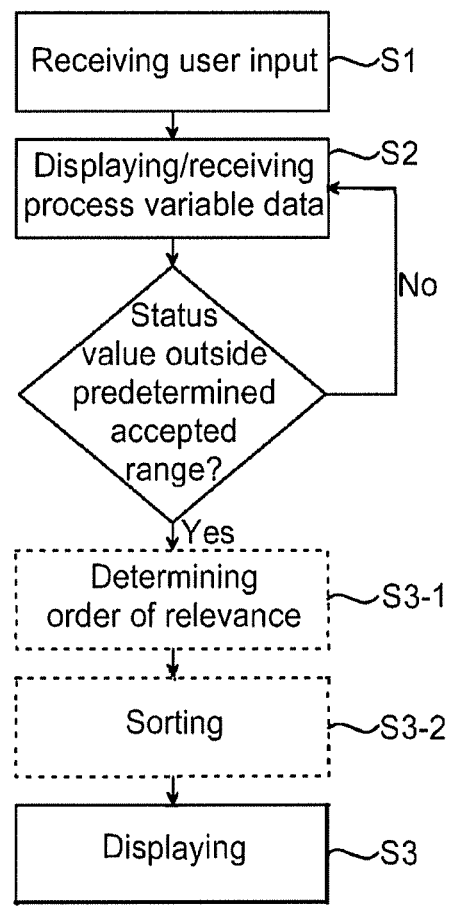
FIG. 3 a flowchart illustrating an example of a method of monitoring and controlling an industrial process.

As shown in FIG. 3, in a first step S1 the control system 1 receives a user input via the input unit 21. The user input contains commands for selecting a set 25-2 of process related images P-1, P-5, P-9 of the plurality of process related images P-1 to P-12. The set 25-2 of process related images may include any number of process related images of the total amount of process related images, depending e.g. on user preference. The set 25-2 of process related images P-1, P-5, P-9 is hence a subset of a superset 25-1 including all process related images P-1 to P-12.

Beneficially, a user may thereby select those process related images which the specific user or operator intends to monitor. Thereby any process related images which are of no interest for that operator may be discarded.

In a step S2 the display device 23 displays the set 25-2 of process related images P-1, P-5, P-9. The process related images P-1, P-5, P-9 of the set 25-2 of process related images P-1, P-5, P-9 are displayed in succession. The duration of displaying each process related image P-1, P-5, P-9 of the set 25-2 of process related images P-1, P-5, P-9 is predetermined either by the user or by the control system 1. Thus, the set 25-2 of process related images P-1, P-5, P-9 are displayed as a slide show on the display device 23.

While the display device 23 displays the process related images P-1, P-5, P-9 of the set 25-2 of process related images, the control system 1 via the communications unit 15 receives process variable data of the plurality of process variables from the control units 7-1, 7-2, 7-3, 7-4. The control system 1 essentially continually receives process variable data to thereby be able to detect abnormal situations in the industrial process generating alarms. An abnormal situation may for instance occur if process variable data is received indicating that a process variable has a status value outside a predetermined accepted range. In order to determine whether an abnormal situation has occurred, the control system 1 may be able to determine a status value of a process variable from the process variable data, and compare the status value with a reference value or predetermined accepted range of values.

In response to having received process variable data indicating that a process variable has a status value outside a predetermined accepted range, the control system 1 via the display device 23 is arranged to display a process related image which is associated with the process variable having the status value outside the predetermined accepted range in a step S3.

Figure 2B:
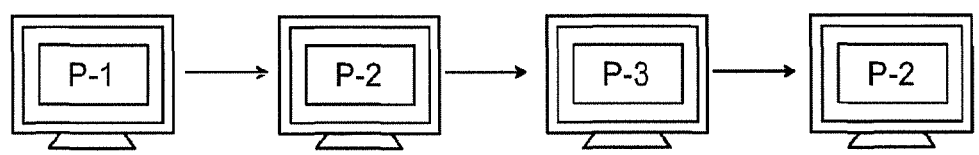

A typical process can be described by means of FIG. 2b showing a slide show of the set 25-2 of process related images P-1, P-2 and P-3. In one embodiment the duration of displaying each image P-1, P-2 and P-3 is predefined. The process related images P-1, P-2 and P-3 are displayed one after the other in succession until an abnormal situation occurs which requires the attention of an operator, and which may require an operator to act. In the example of FIG. 2b an abnormal situation occurs in a process component associated with the process related image P-2 when the process related image P-3 is displayed on the display device 23. As a result, the process related image P-2 is displayed even if the predetermined duration of time of displaying process related image P-3 has not yet expired. Thereby an operator will be able to immediately detect the abnormal situation and take actions accordingly. The process related image P-3 which is displayed as a result of receiving process variable data indicating that a process variable has a status value outside a predetermined accepted range may be displayed in such a way as to draw the attention of an operator thereto. To this end for instance a sound, a different colour, or flickering of part of or the entire process related image may be provided so as to allow for the operator to easily detect that an abnormal situation has occurred.

In a step S4, the control system 1 can receive an input command provided e.g. by an operator via the input unit 21. The input command can be input via e.g. the input unit 21 in response to step S3 of displaying the process related image which is associated with the process variable having the status value outside the predetermined accepted range.

In a step S5 the control system 1 may via the control unit 7-1, 7-2, 7-3, 7-4 which is associated with the affected process component having a process variable with a status value outside the predetermined accepted range control that process component based on the input command to normalise the condition of the process component, i.e. to remove the abnormal situation.

In one embodiment, if several process variables have status values outside a predetermined accepted range of values, the computer device 13 is arranged to determine an order of relevance of each process related image P-1, P-5, P-9 of the set 25-2 of process related images based on the process variable data in a step S3-1.

In a step S3-2 of sorting, the process related images P-1, P-5, P-9 of the set 25-2 of process related images are sorted based on the order of relevance of abnormal situations based on the status values outside the predetermined accepted range of values. The process related images may for instance be sorted such that the process related image associated with the currently most relevant abnormal situation may be sorted to be first in the sorting order. In step S3 the display device 23 may display the process related images according to the order of relevance of the sorted process related images.

The inventive concept has mainly been described above with reference to a few embodiments. However, as is readily appreciated by a person skilled in the art, other embodiments than the ones disclosed above are equally possible within the scope of the invention, as defined by the appended patent claims. The control system may for instance be of SCADA type and it may be a distributed or centralised control system. Moreover, in one embodiment, an operator may end the slide show by providing a user input via the input unit. In one embodiment the set of process related images may be changed by a user, or additional process related images may be added to the set of process related images.

What is claimed is:

1. A method of monitoring and controlling an industrial process by means of a control system, the industrial process associated with a plurality of process variables, the method comprising the steps of:

displaying a set of process related images, which are user-selected, on a display device of the control system, each process related image of the set of process related images being associated with a process variable of the plurality of process variables, wherein the process related images of the set of process related images are displayed in succession without interaction from a user, and wherein a duration of displaying each process related image of the set of process related images is predetermined, receiving process variable data of the plurality of process variables while the step of displaying is carried out, and when process variable data is received indicating that a process variable has a status value outside a predetermined accepted range, and in response thereto:

directly displaying, on the display device, a process related image which is associated with the process variable having the status value outside the predetermined accepted range, receiving an input command for controlling the process variable, and controlling the process variable based on the input command.

2. The method of claim 1, further comprising, prior to the step of displaying, receiving a user input for selecting the set of process related images to be displayed in the step of displaying from a superset of process related images.

3. The method of claim 1, further comprising determining an order of relevance of the set of process related images based on the process variable data.

4. The method of claim 3, further comprising sorting the process related images based on the order of relevance.

5. The method of claim 4, wherein the step of displaying comprises displaying the process related images according to the order of relevance of the sorted process related images.

6. The method of clan 1, wherein the control system comprises a SCADA system.

7. The method of claim 1, wherein the control system comprises a plurality of control units, each control unit arranged to control a process component.

8. A computer program product comprising a non-transitory computer readable medium having a computer program stored thereon, where the computer program is executed on a computer to perform a method of monitoring and controlling an industrial process by means of a control system, the industrial process associated with a plurality of process variables, the method comprising the steps of:

displaying a set of process related images which are user-selected, on a display device of the control system, each process related image of the set of process related images being associated with a process variable of the plurality of process variables, wherein the process related images of the set of process related images are displayed in succession without interaction from a user, and wherein a duration of displaying each process related image of the set of process related images is predetermined, receiving process variable data of the plurality of process variables while the step of displaying is carried out, and when process variable data is received indicating that a process variable has a status value outside a predetermined accepted range, and in response thereto:

directly displaying, on the display device, a process related image which is associated with the process variable having the status value outside the predetermined accepted range, receiving an input command for controlling the process variable, and controlling the process variable based on the input command.

9. A control system for controlling an industrial process associated with a plurality of process variables, the control system comprising:

a plurality of control units, each control unit being arranged to control a respective process variable of the plurality of process variables, a display device arranged to display a set of process related images which have been user-selected, each process related image of the set of process related images being associated with a process variable of the plurality of process variables, wherein the control system is arranged to display the process related images in succession on the display device without interaction from a user, and wherein a duration of displaying each process related image of the set of process related images is predetermined, and an input unit arranged to receive input commands, wherein the control system is arranged to receive process variable data of the plurality of process variables, and wherein when process variable data indicating that a process variable has a status value outside a predetermined accepted range is received by the control system, the display device is arranged to directly display a process related image which is associated with the process variable having the status value outside the predetermined accepted range, and wherein the input unit is arranged to receive an input command to control the process variable having the status value outside the predetermined accepted range, and wherein a control unit associated with the process variable with the status value outside the predetermined accepted range is arranged to control that process variable based on the input command.

10. The control system of claim 9, arranged to receive a user input for selecting the set of process related images to be displayed on the display device from a superset of process related images.

11. The control system of claim 9, arranged to determine an order of relevance of the set of process related images based on the process variable data.

12. The control system of claim 11, arranged to sort the process related images based on the order of relevance.

13. The control system of claim 12, wherein the display device is arranged to display the process related images according to the order of relevance of the sorted process related images.

14. The control system of claim 9, wherein the plurality of control units comprises a remote terminal unit or a programmable logic controller.

\* \* \* \* \*